US006983901B2

(12) United States Patent
Bitton et al.

(10) Patent No.: US 6,983,901 B2
(45) Date of Patent: Jan. 10, 2006

(54) METHOD FOR RECYCLING ALUMINUM ALLOY WHEELS

(75) Inventors: Daniel R. Bitton, Thornhill (CA); Thomas E. Lobel, Toronto (CA)

(73) Assignee: House of Metals Company Limited, Toronto (CA)

( * ) Notice: Subject to any disclaimer, the term of this patent is extended or adjusted under 35 U.S.C. 154(b) by 119 days.

(21) Appl. No.: 10/657,706

(22) Filed: Sep. 9, 2003

(65) Prior Publication Data

US 2005/0051647 A1 Mar. 10, 2005

(51) Int. Cl.
*B02C 19/12* (2006.01)

(52) U.S. Cl. .............................. 241/24.14; 241/24.15; 241/25; 452/38.4

(58) Field of Classification Search ............ 241/24.14, 241/24.15, 25, 19
See application file for complete search history.

(56) References Cited

U.S. PATENT DOCUMENTS 3,905,556 A 9/1975 Drage
4,069,145 A 1/1978 Sommer, Jr. et al.
4,337,900 A * 7/1982 Williams et al. .............. 241/14
4,476,655 A 10/1984 Ansbaugh
4,609,155 A 9/1986 Garnier
4,965,968 A 10/1990 Kelsall
5,060,871 A 10/1991 Brassinga et al.
5,133,505 A 7/1992 Bourcier et al.
5,333,797 A 8/1994 Becker et al.
5,443,157 A 8/1995 Baker et al.
5,769,331 A * 6/1998 Yamagishi et al. ............ 241/5
5,885,141 A 3/1999 Watkin
6,375,106 B1 4/2002 Sears
6,422,493 B1 7/2002 Simon et al.

FOREIGN PATENT DOCUMENTS

JP 2-083167 3/1990
JP 2-160473 * 6/1990
WO WO 95/19454 * 7/1995

* cited by examiner

*Primary Examiner*—Mark Rosenbaum
(74) *Attorney, Agent, or Firm*—Bereskin & Parr

(57) ABSTRACT

A method of recycling aluminum alloy wheels, the method comprises providing a feed of aluminum alloy wheels of a particular alloy; fragmenting the aluminum alloy wheels into a plurality of pieces; subjecting the pieces to magnetic separation to produce pieces having a reduced iron content; and, subjecting the pieces having a reduced iron content to shot blasting to produce shot blasted pieces. An optional eddy treatment step may be used.

34 Claims, 1 Drawing Sheet

METHOD FOR RECYCLING ALUMINUM ALLOY WHEELS

FIELD OF THE INVENTION

The present invention relates to a method and apparatus for recycling aluminum, and more particularly relates to a method and apparatus for recycling aluminum alloy wheels.

BACKGROUND OF THE INVENTION

Aluminum has a relatively low density and high strength. Accordingly, aluminum by itself or alloyed with other metals is useful in many applications as it permits light weight constructions. For example, this feature of aluminum makes aluminum desirable for both beverage cans and aluminum alloy wheels. With the increasing use of aluminum in these contexts, and the resultant increase in demand for aluminum, it is also increasingly important that constructions made from aluminum be efficiently recycled.

Prior art technologies have been devised to recycle aluminum. For example, U.S. Pat. No. 5,133,505 discloses a method and apparatus for separating aluminum alloys from other materials. This invention relies on magnetic separation and subsequent shredding. However, for a number of reasons, the process and apparatus taught by this patent are not ideal for recycling aluminum alloy wheels. That is, the prior art method and apparatus are neither suitable for single source aluminum recycling material such as aluminum alloy wheels. Further, these prior art technologies do not teach an effective way of dealing with contaminates that may be on the surface of aluminum products such as aluminum alloy wheels.

Aluminum car wheels are made of high purity aluminum alloy—often from Aluminum Association alloy number A356.2. In addition to the high purity aluminum alloy, car wheels may also comprise the following materials: paint, clearcoat, chrome plating, lead weights, brass, rubber, brass fittings, stainless steel or iron inserts. If an alloy wheel made from alloy number A356.2 is melted while contaminated with too much of any of these metals, then the composition of the melt will vary from the specification required of alloy A356.2 and will not be suitable for use in casting new alloy wheels made from alloy A356.2. As a result, aluminum alloy wheels are often recycled to produce less valuable products. For example, aluminum alloy wheels are often re-melted and used in the production of a secondary alloy, namely alloy A356.1, or as an iron diluter for the production of various lower purity aluminum alloys.

The value of alloy A356.1 or iron diluters is less than that of alloy A356.2. Therefore, when aluminum alloy wheels are recycled in this manner, much of their latent value is lost as the resulting recycled material is less valuable than the high purity aluminum alloy A356.2 from which the aluminum wheels were originally made.

The paint and clearcoat present on the wheels are also of concern when alloy wheels are remelted for recycling or if the wheels are first heated to remove these contaminants as these contaminants may release toxic fumes during remelting. Therefore additional environmental equipment, such as bag houses, are required which increases the cost of recycling.

SUMMARY OF THE INVENTION

An object of a first aspect of the invention is to provide an improved method of recycling aluminum alloy wheels.

In accordance with this first aspect of the invention there is provided a method of recycling aluminum alloy wheels. The method comprises (a) providing a feed of aluminum alloy wheels of a particular alloy; (b) fragmenting the aluminum alloy wheels into a plurality of pieces; (c) subjecting the pieces to magnetic separation to produce pieces having a reduced iron content; and, (d) subjecting the pieces having a reduced iron content to shot blasting to produce shot blasted pieces.

An object of a third aspect of the invention is to provide an improved method of recycling aluminum alloy wheels.

In accordance with this third aspect of the invention there is provided a method of recycling aluminum alloy wheels. The method comprises: (a) providing a feed of aluminum alloy wheels of a particular alloy; (b) fragmenting the aluminum alloy wheels into a plurality of pieces; and, (c) subjecting the pieces to shot blasting to produce shot blasted pieces.

BRIEF DESCRIPTION OF THE DRAWINGS

These and other advantages of the instant invention will be more fully and completely understood in conjunction with the following detailed description of the preferred aspects of the present invention with reference to the following drawing, in which FIG. 1, in a flowchart, illustrates a method of recycling aluminum alloy car wheels in accordance with a preferred aspect of the present invention.

DETAILED DESCRIPTION OF PREFERRED ASPECTS OF THE INVENTION

Figure 1:
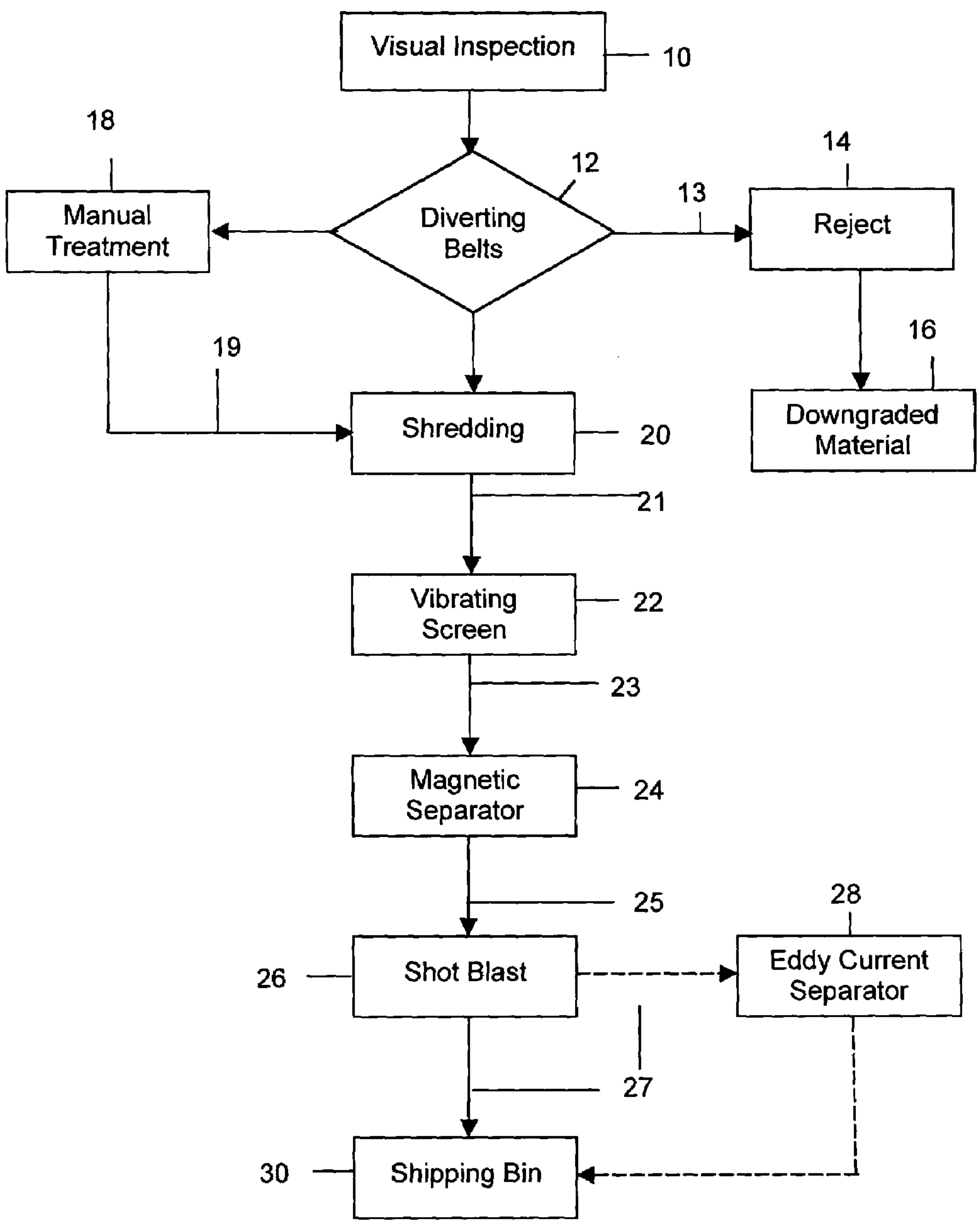

Referring to FIG. 1, there is illustrated in a flowchart a method of recycling aluminum alloy wheels in accordance with an aspect of the present invention. The alloy wheels may be made from any aluminum alloy currently or in the future used in the manufacture of wheels for vehicles. The vehicles may be cars, trucks, motorcycles and are preferably cars.

In order to preserve the composition of the alloy, the wheels that are processed at the same time are preferably made of the same alloy. Currently, alloy 356.2 is typically used to manufacture alloy car wheels and, therefore, it is preferred to provide only wheels made from alloy A356.2 as the feed material to this process. However, it will be appreciated by those skilled in the art that if different alloys are used to manufacture alloy wheels then wheels may be sorted into piles each of which are made of the same alloy and that each pile may be separately recycled.

The method begins with step 10, during which wheels received for recycling are visually inspected and classified. At the visual inspection station, a plurality of transport means, preferably drive belts or conveyor belts 12, are used to transport the material to downstream stations based on the classification of the material at the visual inspection station. Any means known in the material handling art to move wheels similar in mass to alloy wheels may be used. At visual inspection step 10, the incoming supply of wheels may be divided to a rejection area 14, a manual treatment area 18 or may be suitable for immediate processing and sent to shredder 20.

The wheels received for recycling are examined to determine if they are sufficiently free of contaminants 13 including foreign material such as lead, brass, stainless steel or iron which may be present as batteries or other materials received with the wheels from an autowrecker, or garbage such as wood and cardboard to permit recycling. These contaminants may affect the chemistry of the recycled product and are therefore removed.

Chrome wheels are coated with chrome. If too much chrome is present when the alloy is recycled alloy is melted, then the melted recycled alloy will not meet the required alloy specification. Therefore, the chrome wheels are preferably removed at this stage and may be stored by future processing or shipped for use elsewhere. It will be appreciated that the inclusion of a few chrome wheels will not generally affect the composition of the melted recycled alloy. However, it is preferred that all chrome wheels are removed at this stage. Such wheels may be sent to manual treatment area 18 where they are separated out, e.g., by a worker manually removing the chrome plated wheels to a storage area. Alternately, not shown, a diverting belt 12 may be provided at visual inspection area 10 to transport the chrome wheels to a separate storage area. The chrome-plated wheels may be run separately through the rest of the process when the non-chrome plated aluminum alloy wheels made from, e.g., alloy 356.2, are not being processed.

Truck wheels and motorcycle wheels are typically constructed from a different alloy. If so, then these wheels are also preferably removed, as their presence will alter the composition of the recycled melted alloy. If these wheels are made from an aluminum alloy, then they may be stored and processed through the apparatus at a later date to produce a different recycled alloy. For example, the motorcycle wheels may be separated and stored in a first area for later processing by themselves and the truck wheels may be separated and stored in a second area for later processing by themselves. This separating step may be conducted to produce a plurality of piles, each of which contains wheels of the some alloy, Such wheels may be sent to manual treatment area 18 where they are separated out, e.g., by a worker manually removing these wheels to a storage area. Alternately, not shown, a diverting belt 12 may be provided at visual inspection area 10 to transport these wheels to one or more separate storage areas. These wheels may be run separately through the rest of the process when other aluminum alloy wheels are not being processed.

The contaminants 13 are removed, e.g., by being placed on diverting belt 12, and stored in another area (step 14) where they may then be collected in step 16 In addition, any wheel that is not suitable for recycling (e.g. it is not made from an aluminum alloy) may also be diverted to rejection area 14.

Some wheels may have a level of contaminants that makes them unsuitable for immediate processing. Excess contaminants may be removed from the wheels at manual treatment area 18 to prepare the wheels for recycling. Once treated, the wheels may be transported to shredder 20, such as by transport belt 19.

In the shredding step, the recycled wheels are fed to a shredder 20 that is suitable for shredding the wheels into a size suitable for feed material to a magnetic separator 24. Any shredder known in the art may be used. For example, aluminum alloy car wheels may be supplied to a hopper of a conventional shredding apparatus, such as the SSI Series 45 H shredder available from SSI Shredding Systems Inc. at 9760 SW Freeman Drive, Wilsonville, Oreg., 97070-9286, USA. The shredding apparatus includes a cutter box housing the cutters, which are mounted on parallel shafts that rotate horizontally in opposite directions. The feed hopper is located above the cutter box. Due to the force of gravity, aluminum alloy car wheels placed in the feed hopper are fed downwardly into the proper location where they are engaged by the cutters and torn or cut into small pieces, shredded product 21. Preferably, the aluminum alloy wheels are cut into pieces from two inches to three inches in length and, more preferably, approximately two inch pieces. If the wheels are shredded to pieces this size, then contaminants such as valve stems, permissible dimensions are freed up such that a sufficient percentage of these may be removed by magnetic separator 24 and, optionally an eddy current separator 28, so as not to alter the composition of the melted recycled aluminum outside the specification of the alloy being recycled.

In addition to producing two-inch aluminum pieces, the shredding process produces fines and dirt. Preferably, these byproducts of the shredding process are separated from the two-inch aluminum pieces such as by screening. Thus, after the shredding step, the shredded product may be fed to a vibrating screen 22 to produce a treated shredded product 23 free from such material. This vibrating screen has a plurality of openings dimensioned to admit the dirt and fines but retain the shredded product on top. For example, each opening in the plurality of openings may be smaller than the two-inch aluminum pieces to retain these pieces on the vibrating screen while permitting the fines and dirt to pass through. The fines and dirt passing through the vibrating screen are preferably recovered by melting or an alternative process. For example, the fines will typically have a high aluminum content, and would preferably be melted down for recycling.

In the magnetic separation step, the shredded aluminum alloy is supplied to a magnetic separator 24, which removes the ferrous material from the shredded pieces to produce a shredded product having a reduced iron content 25. Such a magnetic separator may, for example, be a magnetic drum having an operating radius of 180°. The two-inch aluminum alloy pieces are supplied to the drum. Those pieces without significant ferrous content pass through the magnetic drum, while those with significant ferrous content stick to the sides of the magnetized drum, thereby being removed from further processing. Pieces with significant iron content would include pieces having fittings and inserts such as washers that are made from iron or steel.

Optionally, the magnetic separation step may be dropped, provided the shredded product is largely free of ferrous materials. This may be insured by pre-sorting the alloy wheels beforehand such that only aluminum alloy wheels lacking significant ferrous content are processed.

The shredded product having a reduced iron content 25 is fed to shot blast apparatus 26. In this shot blast step, the aluminum alloy pieces are supplied to any shat blast apparatus suitable for treating pieces of the size of the shredded product having a reduced iron content 25. For example, the apparatus may be a centrifugal blasting apparatus, such as the model (FB-4/28/E/MR) Flexbel™ system available from BCP Wheelabrator of 1219 Corporate Drive, Burlington, Ontario, L7L 5V5, Canada, which is suitable for blast cleaning small pieces. Preferably, one half inch or larger S330 steel shot, also available from BCP Wheelabrator, is used.

This model FB-4/28/E/MR centrifugal blasting apparatus includes a housing that completely encloses a conveying means formed of a plurality of flights extending crosswise between endless chains for travel along a predetermined path. This housing is sectioned into four compartments including one entrance chamber, two blast chambers, and one shakeout chamber. The flights in the blast chambers are made of blast-resistant manganese rods, while the flights in the shakeout and entrance chambers can be made of less expensive lighter duty material Within the blast chambers, abrasive is projected against the aluminum pieces to clean their surfaces. The impact of the abrasive with these surfaces dislodges debris from the surfaces. The debris is then removed from the system in the shakeout chamber, and the spent abrasive is re-circled back to the blast wheel. The debris removed by blasting includes organic compounds, such as paint, clearcoat and rubber, as well as copper and chrome.

Following the blast cleaning step, the cleaned aluminum pieces 27 may be collected and later shipped for use as a feed material to a wheel of other manufacturing operation in step 30. Alternatively, an eddy current separator 28 may be used to further treat cleaned aluminum pieces 27.

Eddy current separators 28 separate materials according to their density and electrical conductivity by using electromagnetically induced eddy currents to produce repulsive forces between an electromagnet and the material in which the eddy current is induced. Any such apparatus known in the art may be used. Typically, in an eddy current separator, a rapidly changing current in an inductor in the separator produces a magnetic field. The flux of this magnetic field is cut by conductive material lying within the resulting magnetic field. Since the flux varies with time, and the conductive material within the field cannot link such a time varying flux, a current is induced in the conductive material so as to produce a zero net flux passing through the conductive material. This latter current, termed an eddy current, has a magnetic field associated with it. This magnetic field exerts a repelling force on the first magnetic field. Thus, as the electromagnet is fixed in position, the material in which the eddy current has been induced will be repelled from the electromagnet, while other, relatively non-conductive material is free to move. The repulsive force will vary directly with the value of the eddy current, which, in turn, varies depending on the electrical conductivity of the material. The affect of this repulsive force will, of course, depend on the density of the pieces upon which it acts.

In this optional step, the cleaned aluminum pieces 27 are passed through an intense unidirectional magnetic field. The direction of motion of these pieces is preferably approximately 90° to the direction of the field. As described above, those pieces that have higher conductivity will be repelled to a greater extent than those of lesser conductivity. Those pieces that are less dense will respond to the repulsive forces generated to a greater extent than the pieces that are more dense. Thus, the plurality of pieces will be separated based on their relative conductivities and densities.

The cleaned aluminum pieces 27 may differ in density and conductivity due to the presence of other materials. For example, aluminum alloy wheels may include lead weights, brass fittings, or stainless steel fittings to name a few. The cleaned aluminum pieces 27 may including lead weights, brass fittings, or stainless steel and will therefore differ in both average density and conductivity from those cleaned aluminum pieces 27 that do not include significant amounts of these materials. The latter cleaned aluminum pieces 27 that do not include significant amounts of lead, brass or stainless steel are separated by the eddy current separator and sent on to step 30.

When aluminum alloy wheels lacking chrome plating are not being processed, then chrome plated wheels or material of another alloy may be processed. The steps are essentially the same as described above; however, the end product comprises an alloy of a different composition.

For a typical chrome plated aluminum alloy wheel, the composition of the components other than aluminum are as follows:

| | | | |
|---|---|---|---|
| Cu | 3.5% | Fe | .16–.20% |
| Mg | .35% | Ni | 3.0% |
| Si | 7.0% | Ti | .15% |
| Cr | .50% | | |

After shot blast cleaning, a sample of the above-described chrome-plate aluminum alloy wheel was analyzed and the composition of the components other than aluminum are as follows:

| | | | |
|---|---|---|---|
| Cu | .60% | Fe | .20% |
| Mg | .28% | Ni | 3.0% |
| Si | 7.0% | Ti | .15% |
| Cr | .009–.17% | | |

From the foregoing analysis, it is apparent that blasting removed most of the copper and chrome, but failed to remove any of the silicone, iron, nickel or titanium (the silicone, iron and titanium are alloyed into the metal). The resulting product, however, is a relatively valuable aluminum alloy having 0.6% Cu and 3.0% Ni with very low chrome. This product can be sold to piston alloy makers and provides a very good nickel additive. Thus, the process, when applied to chrome plated wheels, produces a recycled alloy of high value which is suitable for many commercial uses.

Other variations and modifications of the invention are possible. For example, the aluminum alloy wheels may be converted to fragments in many different ways other than by being shredded. For example, the aluminum alloy wheels may be crushed, rather than shredded. However, crushing would be more expensive as it would be more difficult to separate the other components after crushing. In addition, crushing would produce lower value fines. While the foregoing has described the aspects of the invention that are applied to aluminum alloy wheels, those of skill in the art will realize that the method will also be applicable to the recycling of other aluminum components, whether or not such components are fragmented beforehand. All such modifications or variations are believed to be within the sphere and scope of the invention as defined by the claims appended hereto.

What is claimed is:

1. A method of recycling aluminum alloy wheels, the method comprising:

a) providing a feed of aluminum alloy wheels of a particular alloy;

b) fragmenting the aluminum alloy wheels into a plurality of pieces;

c) subjecting the pieces to magnetic separation to produce pieces having a reduced iron content; and, d) subjecting the pieces having a reduced iron content to shot blasting to produce shot blasted pieces.

2. The method as claimed in claim 1 wherein the step of fragmenting the aluminum alloy wheel into the plurality of pieces comprises shredding the aluminum alloy wheel into the plurality of pieces.

3. The method as claimed in claim 2 wherein the shredding produces at least one of dirt and fines and the method further comprises separating the dirt and fines from the plurality of pieces.

4. The method as claimed in claim 3 wherein the dirt and fines from the plurality of pieces are removed by screening.

5. The method as claimed in claim 1 further comprising collecting the shot blasted pieces for use in manufacturing a component made from aluminum alloy.

6. The method as claimed in claim 1 further comprising collecting the shot blasted pieces for use in manufacturing an aluminum alloy wheel.

7. The method as claimed in claim 1 wherein the wheels are made from alloy A356.2 and the method further comprises collecting the shot blasted pieces for use in manufacturing aluminum alloy wheels made from alloy A356.2.

8. The method as claimed in claim 1 further comprising subjecting the shot blasted pieces to eddy current separation to produce further treated aluminum alloy pieces.

9. The method as claimed in claim 8 further comprising collecting the further treated aluminum alloy pieces for use in manufacturing a component made from aluminum alloy.

10. The method as claimed in claim 8 further comprising collecting the further treated aluminum alloy pieces for use in manufacturing an aluminum alloy wheel.

11. The method as claimed in claim 8 wherein the wheels are made from alloy A356.2 and the method further comprises collecting the further treated aluminum alloy pieces for use in manufacturing aluminum alloy wheels made from alloy A356.2.

12. The method as claimed in claim 1 further comprising removing chrome-plated aluminum alloy wheels from the feed of aluminum alloy wheels.

13. The method as claimed in claim 1 further comprising preparing the feed of aluminum alloy wheels of the particular alloy by removing from a feed of aluminum alloy wheels chrome plated wheels and wheels that are not made of the particular alloy.

14. The method as claimed in claim 13 further comprising separately subjecting the chrome-plated aluminum alloy wheels to steps (b)–(d).

15. The method as claimed in claim 1 wherein the particular alloy is an alloy used for aluminum alloy car wheels and the method further comprises preparing the feed of aluminum alloy wheels of the particular alloy by removing from a feed of aluminum alloy wheels chrome plated wheels, motorcycle wheels and truck wheels.

16. A method of recycling aluminum alloy wheels, the method comprising:

a) providing a feed of aluminum alloy wheels of a particular alloy;

b) fragmenting the aluminum alloy wheels into a plurality of pieces; and, c) subjecting the pieces to shot blasting to produce shot blasted pieces.

17. The method as claimed in claim 16 wherein the step of fragmenting the aluminum alloy wheel into the plurality of pieces comprises shredding the aluminum alloy wheel into the plurality of pieces.

18. The method as claimed in claim 17 wherein the shredding produces at least one of dirt and fines and the method further comprises separating the dirt and fines from the plurality of pieces.

19. The method as claimed in claim 18 wherein the dirt and fines from the plurality of pieces are removed by screening.

20. The method as claimed in claim 16 further comprising collecting the shot blasted pieces for use in manufacturing a component made from aluminum alloy.

21. The method as claimed in claim 16 further comprising collecting the shot blasted pieces for use in manufacturing an aluminum alloy wheel.

22. The method as claimed in claim 16 wherein the wheels are made from alloy A356.2 and the method further comprises collecting the shot blasted pieces for use in manufacturing aluminum alloy wheels made from alloy A356.2.

23. The method as claimed in claim 16 further comprising subjecting the shot blasted pieces to eddy current separation to produce further treated aluminum alloy pieces.

24. The method as claimed in claim 23 further comprising collecting the further treated aluminum alloy pieces for use in manufacturing a component made from aluminum alloy.

25. The method as claimed in claim 23 further comprising collecting the further treated aluminum alloy pieces for use in manufacturing an aluminum alloy wheel.

26. The method as claimed in claim 23 wherein the wheels are made from alloy A356.2 and the method further comprises collecting the further treated aluminum alloy pieces for use in manufacturing aluminum alloy wheels made from alloy A356.2.

27. The method as claimed in claim 16 further comprising removing from the feed of aluminum alloy wheels chrome-plated aluminum alloy wheels.

28. The method as claimed in claim 16 further comprising preparing the feed of aluminum alloy wheels of the particular alloy by removing from a feed of aluminum alloy wheels chrome plated wheels and wheels that are not made of the particular alloy.

29. The method as claimed in claim 28 further comprising separately subjecting the chrome-plated aluminum alloy wheels to steps (b) and (c).

30. The method as claimed in claim 16 wherein the particular alloy is an alloy used for aluminum alloy car wheels and the method further comprises preparing the feed of aluminum alloy wheels of the particular alloy by removing from a feed of aluminum alloy wheels chrome plated wheels, motorcycle wheels and truck wheels.

31. The method as defined in claim 1 wherein each piece in the plurality of pieces is at least two inches in length.

32. The method as defined in claim 16 wherein each piece in the plurality of pieces is at least two inches in length.

33. The method as defined in claim 1 wherein step (d) comprises blasting the pieces using shot having a diameter of at least a half an inch.

34. The method as defined in claim 16 wherein step (c) comprises blasting the pieces using shot having a diameter of at least a half an inch.

* * * * *